(12) United States Patent
Nair

(10) Patent No.: US 6,318,965 B1
(45) Date of Patent: Nov. 20, 2001

(54) INTELLIGENT INTERNAL FAN CONTROLLER

(75) Inventor: Rajesh Muraleedharan Nair, Nashua, NH (US)

(73) Assignee: Degree Controls, Inc., Milford, NH (US)

( * ) Notice: Subject to any disclaimer, the term of this patent is extended or adjusted under 35 U.S.C. 154(b) by 0 days.

(21) Appl. No.: 09/290,238

(22) Filed: Apr. 13, 1999

(51) Int. Cl.[7] ................................................. F04B 41/06
(52) U.S. Cl. ................................... 417/2; 417/42; 417/17
(58) Field of Search ............................... 417/2, 17, 42, 417/32

(56) References Cited

U.S. PATENT DOCUMENTS

| | | | |
|---|---|---|---|
| 5,492,273 | * | 2/1996 | Shah ........................................ 417/45 |
| 6,037,732 | * | 3/2000 | Alfano et al. ......................... 318/471 |
| 6,188,602 | * | 2/2001 | Alexander et al. ............. 365/185.04 |
| 6,249,885 | * | 6/2001 | Johnson et al. ......................... 714/47 |

* cited by examiner

Primary Examiner—Cheryl J. Tyler
(74) Attorney, Agent, or Firm—Iandiorio & Teska

(57) ABSTRACT

An intelligent fan system includes a microcontroller having memory and an interface which provides a connection to a host computer system. The host computer system dynamically provides a plurality of controlled instructions to the microcontroller which are stored in the memory of the microcontroller. The system also includes a temperature sensing device which is connected to the microcontroller. A fan responsive to the communication signal provided by the microcontroller adjusts the speed of the fan in accordance with the plurality of control instructions.

6 Claims, 3 Drawing Sheets

INTELLIGENT INTERNAL FAN CONTROLLER

FIELD OF THE INVENTION

The present invention relates to the field of thermal management, and more specifically to an intelligent internal thermal management fan controller.

BACKGROUND OF THE INVENTION

As is well known, in the last few decades the electronics industry has seen a sea of change in technology. Computers the size of a room have shrunk to the size of a wrist watch. More electronic devices are packed into a smaller space making this revolution possible. This increase in device density has brought with it increase in thermal density, that is, the amount of heat generated per cubic inch.

As is also well known, thermal environment control of a computer or telecommunications equipment has become so critical that a failure in the cooling system can damage the equipment in a matter of minutes. At present, the heat removal from circuits is primarily achieved through air cooling by forced convection over the circuit boards. Air movers such as fans are used in most of the electronic equipment for forced convection.

As is also well known, current fans are configured externally to respond to temperature changes. With such an arrangement, fan voltage is adjusted to correspond to set temperatures. As the voltage is adjusted in response to the sensing of a particular temperature, a corresponding speed, i.e., revolutions per minute (rpm), of a fan results. In some arrangements, fans contain sensors which allow preadjusted temperatures to correspond to preadjusted fan rpms. For example, the detection or sensing of 20° C. may correspond to a fan speed of 1000 rpm, while a sensing of 30° C. may correspond to a fan speed of 2000 rpm.

As is also well known, the relationship of temperature to fan speed may be programmed externally to optimize fan speed. With such an arrangement, a host machine across an interface programs an external controller board, which in turn controls a fan. Using a temperature to fan speed curve, the external controller board controls the rpm of a fan in response to a detected temperature. As is well, known, each of these external controller boards is fan specific, i.e., the host machine programs a specific external fan controller board to control a specific fan. Thus, the host machine can only "talk" or communicate to the fan indirectly, i.e., through the pre-programmed fan-specific external fan controller board. This results in a static relationship between the host and the fan, since information regarding thermal environment gathered by the host machine cannot be imparted on the fan directly. As is well known, standard fans contain only a motor, blades, and a commutation circuit.

What is needed is a field programmable fan which can interface directly with one or more fans and optimize fan performance, i.e., minimize fan noise, minimize power consumption, increase fan longevity, and provide a universal interface between any host machine and fan.

SUMMARY OF THE INVENTION

In accordance with the present invention an intelligent fan system is provided having the components of a standard fan with the addition of a micro-controller, a memory and an interface to provide connection to a host computer system, the host computer system providing operating instructions to the micro-controller which are stored in the memory, an optional temperature sensing device, the temperature sensing device connected to the micro-controller, and a fan motor, the fan motor operating in response to a commutation signal provided by the micro controller. With such an arrangement, the fan can be dynamically controlled by the micro controller at the instructions of the host computer system.

DESCRIPTION OF THE DRAWING(S)

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DESCRIPTION OF THE PREFERRED EMBODIMENT(S)

Figure 1:
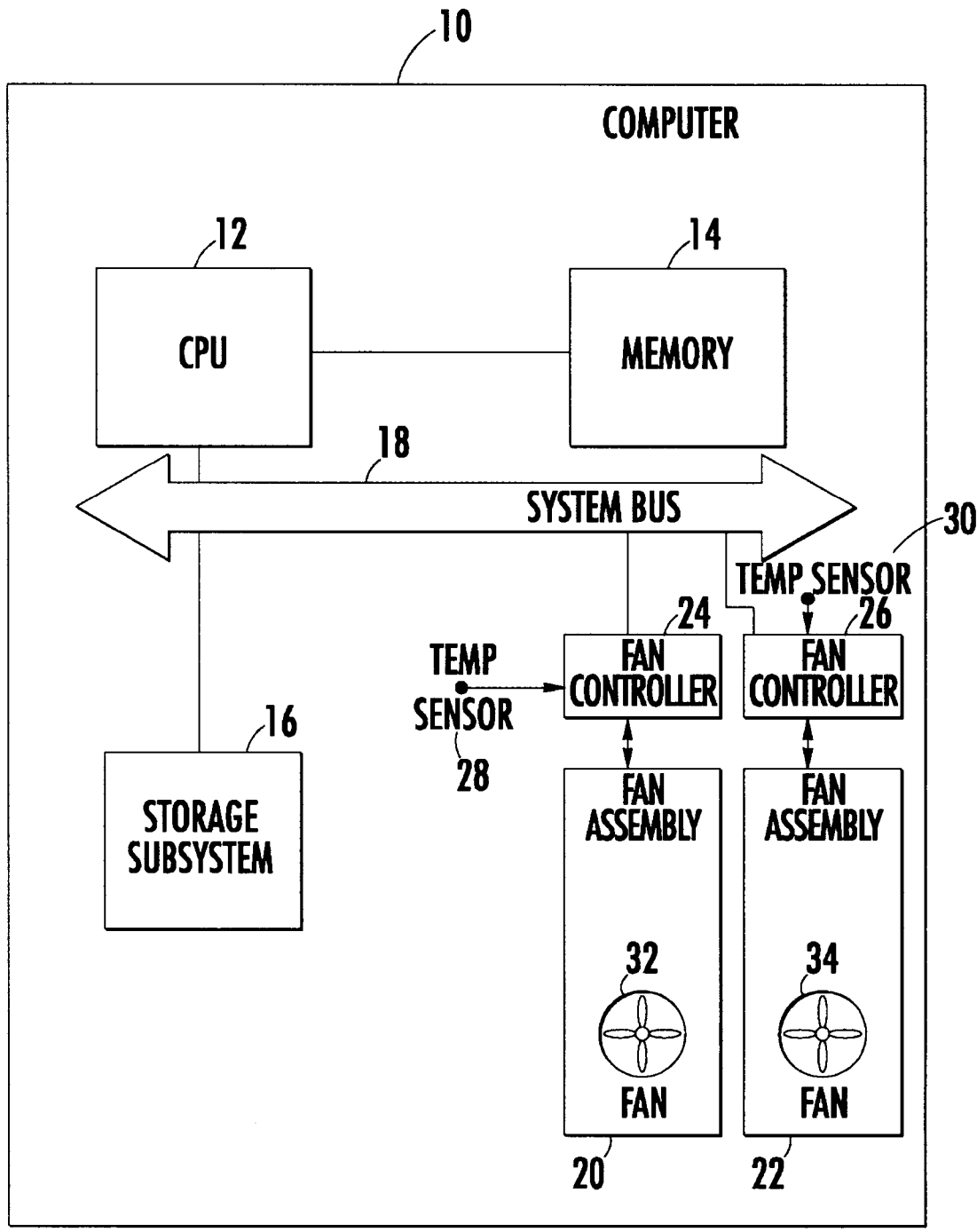
FIG. 1 is a block diagram of an exemplary computer enclosure containing two fan assemblies as illustrative of the prior art.

Referring to FIG. 1, an exemplary computer enclosure (also referred to as a host system) 10 is shown to include a central processing unit (CPU) 12 connected to a memory 14. The CPU 12 is also shown connected to a storage subsystem 16 via a system bus 18. In addition, the CPU 12 is shown to interface with a first fan 20 and a second fan 22. Specifically, the CPU 12 interfaces through a first external fan controller 24 to the first fan 20, and through a second external fan controller 26 to the second fan 22. By way of example, the first external fan controller 24 is shown linked to a first temperature sensor 28, while the second external fan controller 26 is shown linked to a temperature sensor 30.

As can be seen in FIG. 1, each fan requires a fan controller. Thus, the first fan 20 is linked to the first external fan controller 24 and the second fan 22 is linked to second external fan controller 26. Each fan also contains a fan motor. Specifically, first fan 20 contains a fan motor 32 and second fan 22 contains a fan motor 34. The external fan controller 24 controls the fan motor 32 while the external fan controller 26 controls the fan motor 34. Control of the fan motors 32 and 34 is typically accomplished by limiting their respective voltages to a range in response to ambient temperature which are being sensed by their respective temperature sensors and controlled by their respective fan controllers. Thus, first external fan controller 24 controls fan motor 32 in response to input from temperature sensor 28, while second external fan controller 26 controls fan motor 34 in response to input from temperature sensor 30.

Matching appropriate voltage to temperature input and subsequent fan motor rotation is accomplished by programming each of the external fan controllers at the time of manufacture. Specifically, the CPU 12 of the host machine 10 provides the required temperature-voltage range limits and the fan motors are operated as a result of temperature-voltage data. The process is static in that fan speed is controlled in a predictable and predetermined manner while the computer enclosure 10 is in operation. No further programming of the fan controllers is available.

Figure 2:
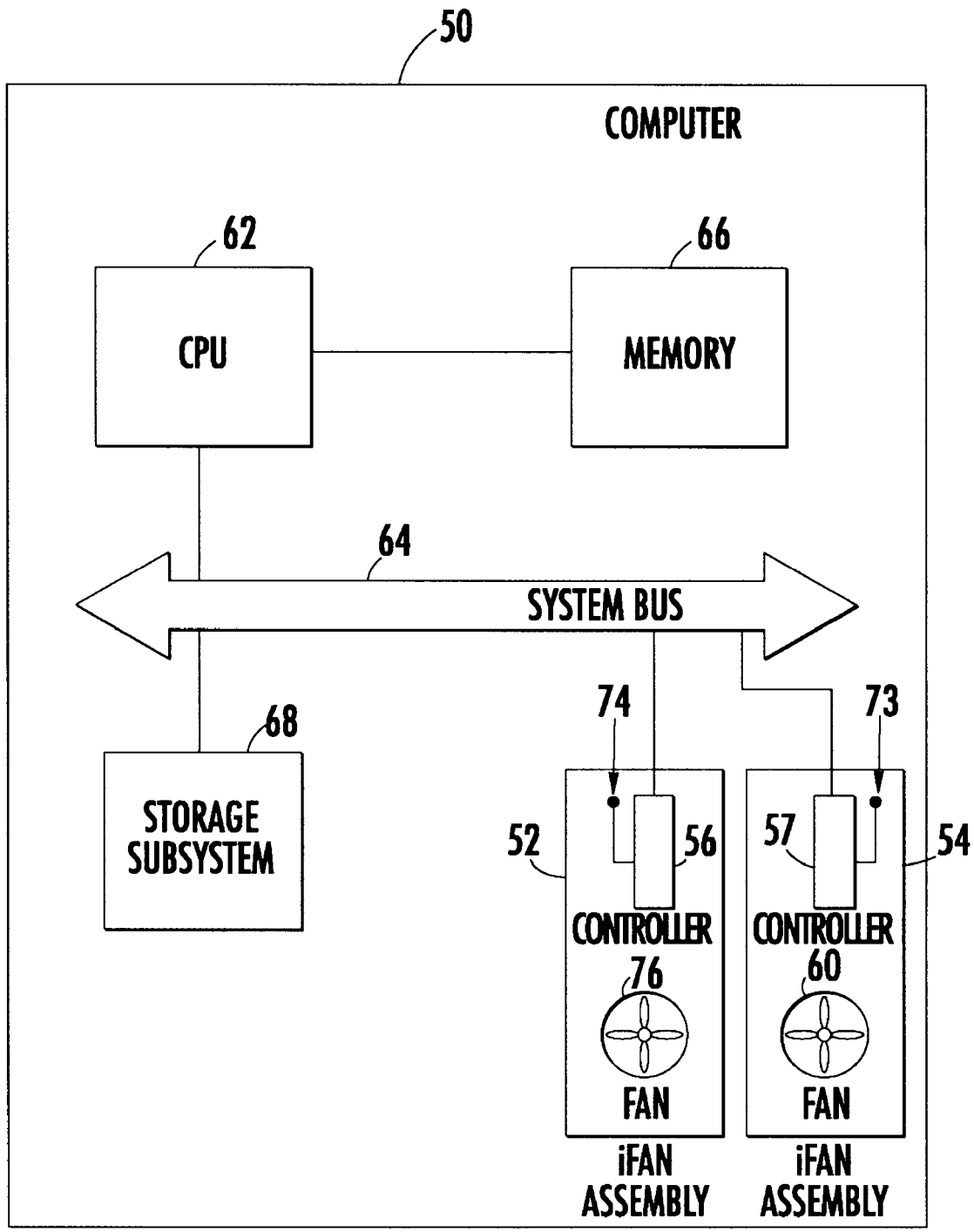
FIG. 2 is a block diagram of an exemplary computer enclosure containing two intelligent fans (iFANs) in accordance with the principles of the present invention.

Referring to FIG. 2, an exemplary computer enclosure (also referred to as a host machine) 50 is shown to include two intelligent fans (referred to as iFANs), labeled 52 and 54 respectively, in accordance with the principles of the present invention. Although the computer enclosure 50 is shown with two iFANs, this is only by way of example. Another computer enclosure may contain one or more iFANs as the requirements of the computer enclosure dictate.

iFAN 52 is shown to contain an internal fan controller 56 controlling a fan motor 76 while iFAN 54 is shown to contain an internal fan controller 57 controlling a fan motor 60. iFan 52 and iFAN 54 are shown connected to a CPU 62 via a system bus 64. Each iFAN is also shown to include a temperature sensor connected to its respective fan controller. Specifically, fan controller 56 is shown connected to a temperature sensor 74 and fan controller 57 is shown connected to a temperature sensor 73.

The CPU 62 of the exemplary host machine 50 is also shown to have a memory 66 and a connection via the system bus 64 to a storage subsystem 68.

As shown in FIG. 2, the fan controllers are distributed. With such an arrangement, the host system may dynamically and continuously interface with each iFAN, thus providing an optimum environment for their operation since the host machine has the greatest knowledge of the thermal load of the entire system.

Figure 3:
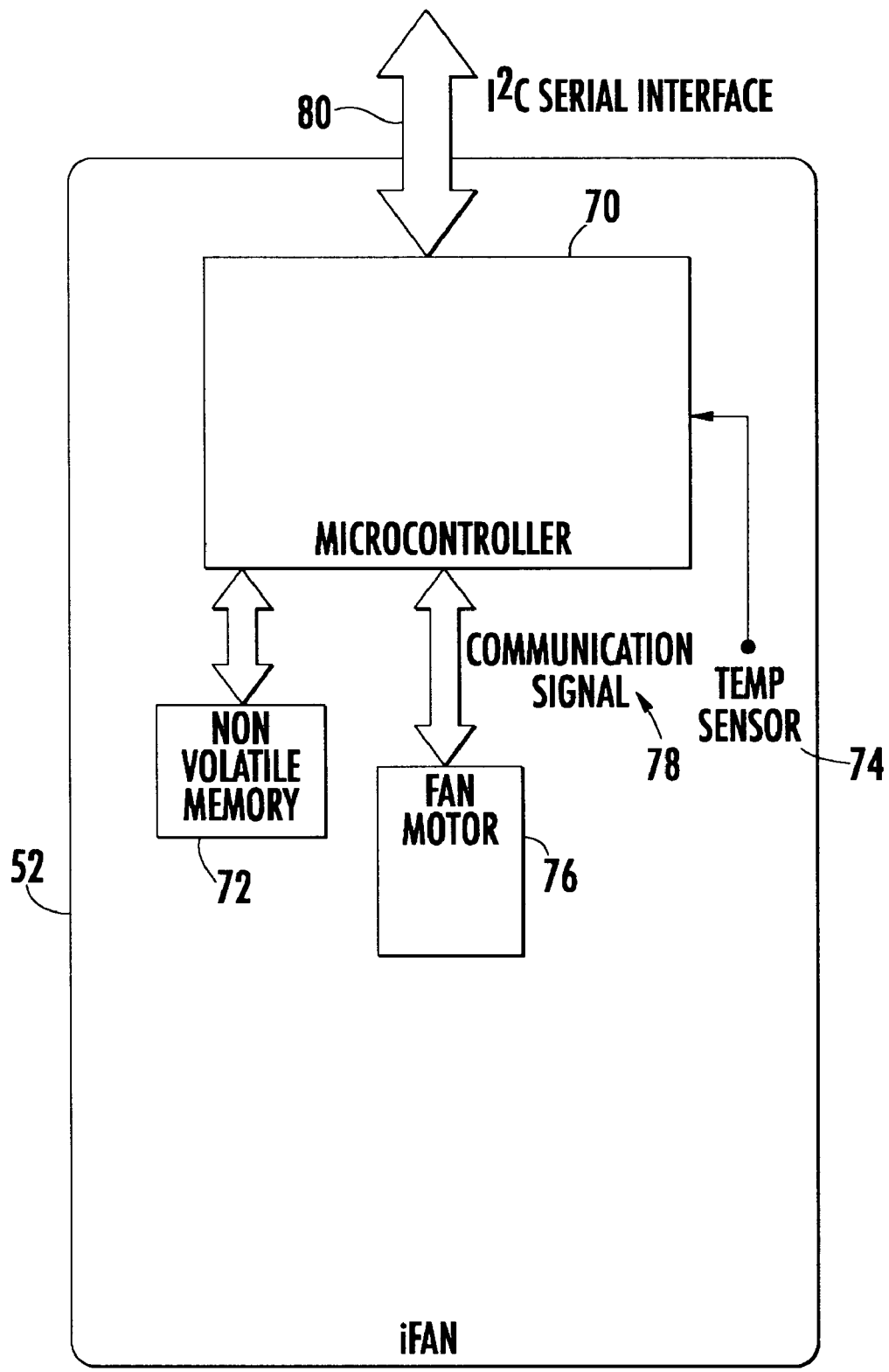
FIG. 3 is a block diagram of one of the iFANS of FIG. 2.

Referring to FIG. 3, a block diagram of a iFAN, iFAN 52 (of FIG. 2) for example, is shown in greater detail. The iFAN 52 is shown to include a micro controller 70 having a nonvolatile memory 72. The micro controller 70 is connected to a temperature sensor 74 and to a fan motor 76. The connection between the micro controller 70 and the fan motor 76 allow the micro controller 70 to pass a commutation signal 78 to the fan motor 76 in response to temperatures detected by the temperature sensor 74. Temperature-voltage programming information is stored in the non-volatile memory 72. The micro controller 70 of the iFAN 52 interfaces directly with the host machine via a standard I$^2$C serial interface 80. Usage of the industry standard I$^2$C serial interface 80 allows the iFAN 52 a universal interface and eliminates the requirement of an external central fan controller. Usage of the micro controller 70 allows the iFAN 52 to be custom configured as the need may arise.

With such an arrangement, the host system 50 may be used to download control information or instructions directly to the iFAN 52 and store this information in the non-volatile memory 72. Thus, if the iFAN 52 were to experience any type of power interruption, the control information would be preserved in the non-volatile memory 72 and available upon restoration of power.

An example of control information would be temperature-rpm correlation information. Thus, when the temperature sensor 74 senses a temperature and sends a signal to the micro-controller 70, the micro-controller 70 acts according to the control information, i.e., temperature-rpm information, stored within the non-volatile memory 72 to alter the rpm of the fan motor 76 appropriately.

Another type of control information which may be contained within the non-volatile memory 72 might be alarm information. Specifically, an alarm may be triggered if the rpm of the fan motor 76 drops below or exceeds a certain threshold, or when the alarm information predicts an abnormality may occur in the operation of the fan motor 76.

Still another type of control information which may be contained within the non-volatile memory 72 might be temperature-rpm information wherein the fan motor 76 may be instructed to control the temperature to a given number. The fan motor 76 can then adjust its rpm to achieve the given temperature number.

In an alternate embodiment of the present invention, a separate temperature sensor 74 is not included within the iFAN 52. Instead, temperature data is dynamically passed to the iFAN 52 by the host machine 50 via the I$^2$C serial interface 80, and thus the micro-controller 70 reacts in response to the temperature passed by the host machine 50 as was described above.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. An intelligent fan system comprising:
   a fan whose speed is dependent on a commutation signal;
   a writeable memory integral with the fan and containing fan control information;
   a micro-controller integral with the fan and which outputs a commutation signal to the fan in accordance with the control information stored in the writeable memory;
   a host computer; and
   an interface between the host computer and the micro-controller;
   the host computer providing different control information to the memory via the interface wherein said micro-controller dynamically outputs different commutation signals in accordance with the control information currently stored in the memory supplied thereto by the host computer.

2. The intelligent fan system of claim 1 further including a temperature sensor linked to the microcontroller.

3. The intelligent fan system of claim 1 further including a temperature sensor linked to the host computer.

4. The intelligent fan system of claim 1 in which the control information provided to the memory is temperature-rpm data.

5. The intelligent fan system of claim 1 in which the control information provided to the memory is alarm information.

6. The intelligent fan system of claim 1 in which the interface is a serial interface.

* * * * *